United States Patent
Filippi et al.

(10) Patent No.: US 7,981,271 B2
(45) Date of Patent: *Jul. 19, 2011

(54) PSEUDO-ISOTHERMAL RADIAL REACTOR

(75) Inventors: Ermanno Filippi, Castagnola (CH);
Enrico Rizzi, Casnate con Bernate (IT);
Mirco Tarozzo, Ligornetto (CH)

(73) Assignee: Methanol Casale S.A. (CH)

( * ) Notice: Subject to any disclaimer, the term of this patent is extended or adjusted under 35 U.S.C. 154(b) by 876 days.

This patent is subject to a terminal disclaimer.

(21) Appl. No.: 10/541,431

(22) PCT Filed: Jan. 15, 2004

(86) PCT No.: PCT/EP2004/000232
§ 371 (c)(1),
(2), (4) Date: Jul. 5, 2005

(87) PCT Pub. No.: WO2004/067163
PCT Pub. Date: Aug. 12, 2004

(65) Prior Publication Data
US 2006/0171868 A1    Aug. 3, 2006

(30) Foreign Application Priority Data
Jan. 29, 2003 (EP) .................. 03001868

(51) Int. Cl.
*C10G 51/02*    (2006.01)
*C10G 55/02*    (2006.01)
*B01J 8/04*    (2006.01)
*B01J 8/02*    (2006.01)
*F28D 7/00*    (2006.01)

(52) U.S. Cl. .......... 208/49; 422/600; 422/198; 422/200; 422/201; 422/211; 422/218

(58) Field of Classification Search .......... 422/188, 422/189, 190, 193, 198, 200, 201, 211, 213, 422/216, 218, 129, 600; 208/49
See application file for complete search history.

(56) References Cited

U.S. PATENT DOCUMENTS

| | | | | |
|---|---|---|---|---|
| 3,127,247 A | * | 3/1964 | Davis, Jr. ...................... | 422/188 |
| 3,289,756 A | * | 12/1966 | Jaeger ........................... | 165/155 |
| 3,440,021 A | * | 4/1969 | Hinrichs et al. ............. | 422/148 |
| 4,341,737 A | * | 7/1982 | Albano et al. ............... | 422/148 |
| 4,405,562 A | * | 9/1983 | Zardi et al. .................. | 422/148 |
| 4,714,592 A | * | 12/1987 | Zanma et al. ................ | 422/192 |
| 4,769,220 A | | 9/1988 | Zardi | |
| 4,883,646 A | * | 11/1989 | Zardi .......................... | 422/311 |
| 4,942,022 A | * | 7/1990 | Kasai et al. .................. | 422/201 |
| 4,976,928 A | * | 12/1990 | Foster et al. ................. | 422/148 |
| 5,013,426 A | | 5/1991 | Dang Vu et al. | |
| 5,035,867 A | * | 7/1991 | Dang Vu et al. ............. | 422/200 |
| 5,135,722 A | * | 8/1992 | Zardi et al. .................. | 422/148 |
| 5,405,586 A | * | 4/1995 | Koves .......................... | 422/218 |

(Continued)

FOREIGN PATENT DOCUMENTS
DE    28 03 945 A1    8/1978
(Continued)

*Primary Examiner* — Walter D Griffin
*Assistant Examiner* — Huy-Tram Nguyen
(74) *Attorney, Agent, or Firm* — Akerman Senterfitt

(57) ABSTRACT

Pseudo-isothermal radial chemical reactor for catalytic reactions, comprising a substantially cylindrical shell closed at the opposite ends by respective base plates, comprising a reaction zone in which a respective catalytic bed is supported and a plurality of heat exchangers placed in said reaction zone.

7 Claims, 2 Drawing Sheets

U.S. PATENT DOCUMENTS

| | | | |
|---|---|---|---|
| 6,467,758 B1 * | 10/2002 | Filippi | 261/128 |
| 6,620,386 B1 * | 9/2003 | Welch | 422/192 |
| 6,916,453 B2 * | 7/2005 | Filippi et al. | 422/198 |
| 6,919,048 B2 * | 7/2005 | Hoffmann et al. | 422/146 |
| 2002/0018740 A1 * | 2/2002 | Filippi et al. | 422/198 |
| 2002/0088613 A1 * | 7/2002 | Filippi et al. | 165/182 |
| 2002/0159933 A1 * | 10/2002 | Hoffmann et al. | 422/198 |
| 2004/0197246 A1 * | 10/2004 | Stevens et al. | 422/201 |

FOREIGN PATENT DOCUMENTS

| | | |
|---|---|---|
| DE | 41 20 788 A1 | 1/1993 |
| DE | 101 16 150 A1 | 10/2002 |
| EP | 273231 A2 * | 7/1988 |
| EP | 314550 A1 * | 5/1989 |

* cited by examiner

PSEUDO-ISOTHERMAL RADIAL REACTOR

FIELD OF APPLICATION

In its most general aspect the present invention refers to a pseudo-isothermal radial chemical reactor for catalytic reactions, comprising a substantially cylindrical shell closed at the opposite ends by respective base plates, a reaction zone in which at least one respective catalytic bed and a plurality of heat exchangers placed in said reaction zone are supported.

In the rest of the description and in the subsequent claims, with the term "pseudo-isothermal reactor" we mean to identify a reactor for chemical reactions in which the reaction temperature is controlled within a limited range of values around a predetermined optimal value.

Moreover, with reference to the main axis of the reactor, the crossing of the reaction zone by the reactants and the reaction products takes place in the radial direction.

PRIOR ART

As is known, in all pseudo-isothermal reactors it is essential that reactants and products remain inside the reactor for a predetermined residence time which allows both the reactants to react and the mixture of reactants and products to exchange heat with the outside of the reactor (for example through a heat exchanger arranged inside the reaction zone) so as to maintain the pseudo-isothermal conditions inside the reactor itself, as the reaction progresses.

In the prior art pseudo-isothermal reactors with a catalytic bed crossed axially by the reactants are widely used.

These reactors allow high productive capacities to be obtained, but the crossing of the catalytic bed by the gas gives rise to large pressure drops.

To avoid the aforementioned pressure drops it has been proposed to reduce the height of the catalytic bed and simultaneously to increase the radius thereof to keep productivity unchanged. Reactors made in this way, i.e. with a shell having a large diameter, are however not cost-effective from the constructive point of view.

To solve the problem of pressure drops and at to make, the same time, the construction of pseudo-isothermal catalytic reactors more cost-effective, reactors with radial crossing of the catalytic bed have been developed, which extend substantially in the height direction, with a ratio, for example in ammonia synthesis, between height and diameter equal to about 10.

These reactors solve both the problem of the aforementioned pressure drops and the economic problems linked to the construction of shells with large diameters, but they introduce a new recognised drawback.

In said radial reactors, indeed, due to the substantial length of the catalytic bed, it has been noticed that the gaseous reactants, once distributed along the inlet wall of said bed, have insufficient crossing speed of the bed itself.

Said crossing speed negatively influences the heat exchange coefficient between reactants and heat exchange plates.

For these reasons optimal control of the pseudo-isothermicity of the reaction is no longer possible.

SUMMARY OF THE INVENTION

The technical problem underlying the present invention is that of realising a chemical reactor of the aforementioned type having structural and functional characteristics such as to allow effective control of the pseudo-isothermicity of the reaction so as to overcome the drawbacks of the prior art described above.

The aforementioned technical problem is solved by a pseudo-isothermal radial chemical reactor for catalytic reactions, comprising a substantially cylindrical shell closed at the opposite ends by respective base plates, a reaction zone in which a respective catalytic bed and a plurality of heat exchangers placed in said reaction zone are supported, characterised in that it comprises at least one second further reaction zone comprising a respective catalytic bed and a plurality of heat exchangers placed in said second reaction zone, said first and said second reaction zone being in fluid communication with each other.

Further characteristics and advantages of the invention will become clearer from the detailed description of an embodiment of a chemical reactor according to the invention, given hereafter with reference to the attached drawings, for indicative and non-limiting purposes.

DETAILED DESCRIPTION OF A PREFERRED EMBODIMENT OF THE INVENTION

Figure 1:
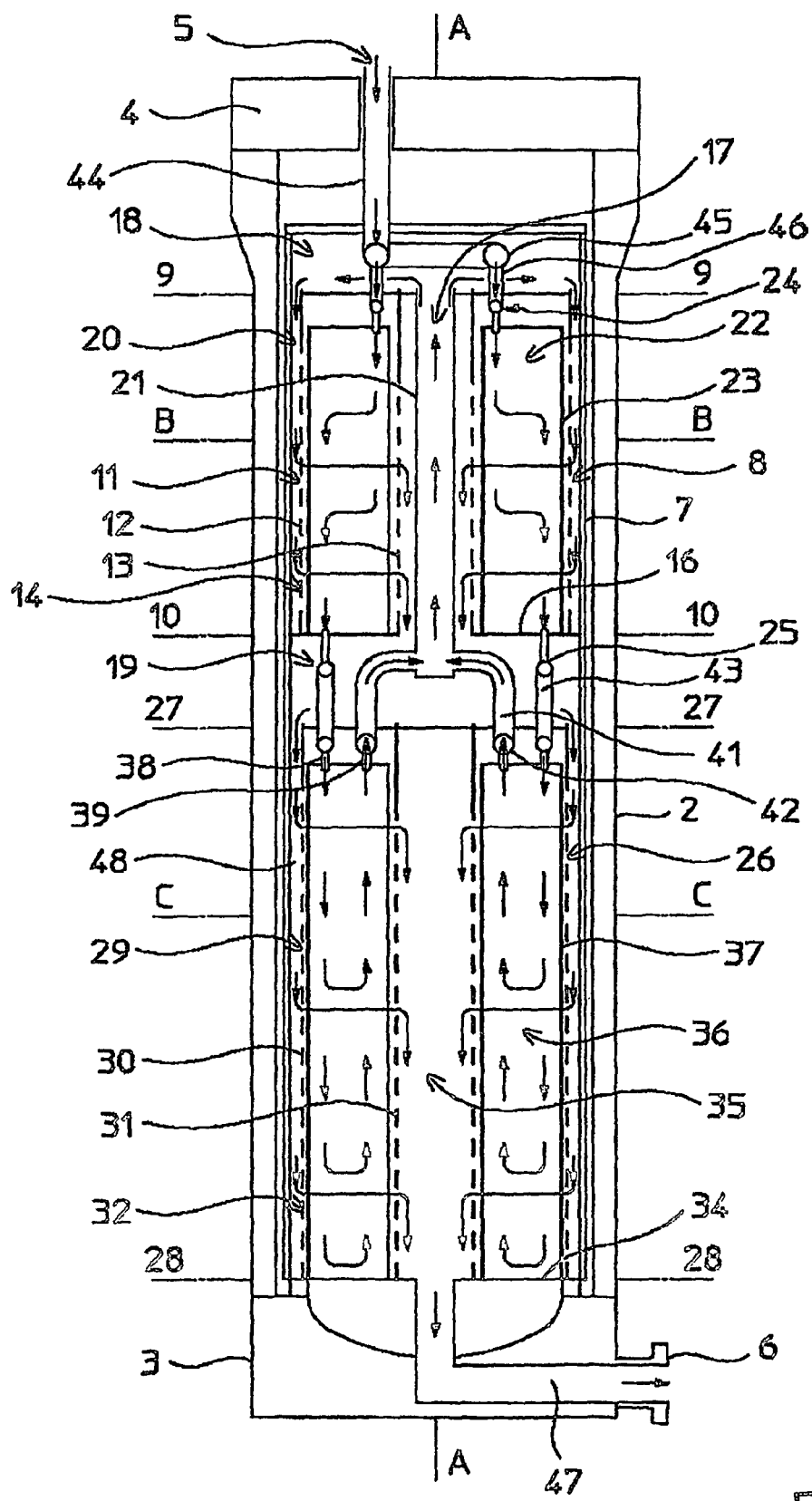
FIG. 1 schematically shows a section view of a chemical reactor for the realisation of the invention.

With reference to FIG. 1, a pseudo-isothermal radial chemical reactor, with vertical axis A-A, is globally and schematically indicated with 1, generally used for carrying out chemical reactions activated by the presence of a catalyst, in this specific (but not limiting) case for ammonia synthesis.

Said reactor 1 comprises a cylindrical shell 2 and opposite base plates, lower 3 and upper 4. The upper base plate 4 is equipped with an opening 5 for the input of reactants, whereas the lower base plate 3 is equipped with an opening 6 for the discharge of the reaction products.

Said shell 2 comprises a cartridge 7, cylindrical and coaxial with said shell 2, in which a first reaction zone 8 is defined, representatively between an upper line 9 and a lower line 10, to hold a predetermined catalytic bed 11 (supported in a per se known way and therefore not represented), intended for being crossed radially by the reactant gases.

Said catalytic bed 11 is bound, along the direction parallel to the axis A-A, by walls 12 and 13, inner and outer respectively, of a substantially annular cylindrical basket 14 which are perforated so as to allow the radial passage of the reactants through the catalytic bed 11.

Said basket 14 is also closed at the bottom by a base plate 16 arranged at the line 10.

A central duct 17, cylindrical and coaxial with said shell, extends from a first chamber 18 for collecting the reactant gas, bound at the bottom by the line 9, up to a second chamber 19 for collecting the gases coming out from the first reaction zone 8, bound at the top by the line 10.

Between said basket 14 and the cartridge 7 there is a gap 20 for the distribution of the reactants inside the catalytic bed 11. In the same way, between said basket 14 and the central duct 17 there is a gap 21 that collects the reactant/product mixture coming out from the catalytic bed 11.

In the catalytic bed 11 a plurality of heat exchangers 22 is immersed and supported. Said heat exchangers 22 are plate-shaped, rectangular and boxed, preferably arranged radially with long sides 23 parallel to the axis A-A of the shell 2 itself.

Said heat exchangers 22 can be arranged, according to a non-limiting embodiment, on many concentric rows, coaxial with said shell 2.

Said exchangers 22 comprise an inlet connector 24 and an outlet connector 25 for an operating heat exchange fluid, said connections being positioned on opposite short sides of said exchangers 22.

In accordance with a characteristic of the present invention and according to a preferred embodiment, in said shell 2 a second reaction zone 26 is defined, representatively bound between an upper line 27 and a lower line 28, to receive a predetermined catalytic bed 29, intended for being crossed radially by the reactant gases and by the reaction products.

Such second reaction zone 26 is associated and in fluid communication with the first reaction zone 8, through the aforementioned chamber 19 which is bound at the bottom by the line 27.

Said catalytic bed 29 is bound along the direction parallel to the axis A-A by walls 30 and 31, outer and inner respectively, of an annular cylindrical basket 32 which are perforated so as to allow the radial passage of the reactants through the catalytic bed 29.

Said basket 32 is also closed at the bottom by an annular base plate 34 arranged at the line 28.

Between said basket 32 and the cartridge 7 there is a gap 48 for the distribution of the reactants inside the catalytic bed 29. Such a gap 48 is in communication with the catalytic bed 11 through the collector 21 and the collection chamber 19.

Between said basket 32 and the axis A-A of the shell 2 there is a collection chamber 35 that collects the reactant/product mixture coming out from the catalytic bed 29, in fluid communication with the opening 6 through the discharge duct 47.

In the catalytic bed 29 a plurality of heat exchangers 36 is embedded and supported. Said heat exchangers 36 are plate-shaped, rectangular and boxed, with long sides. 37 parallel to the axis A-A of the shell 2 itself.

Said heat exchangers 36 can be arranged, according to a non-limiting embodiment, on many concentric rows, coaxial with said shell 2.

Said exchangers 36 comprise an inlet connection 38 and an outlet connection 39 for an operating heat exchange fluid, said connections being positioned on the same short side of said exchangers 36.

The heat exchangers 36 are in fluid communication with the central duct 17 through a feeding duct 41 and a corresponding toroidal collection duct 42.

The heat exchangers 36 are also in fluid communication with the heat exchangers 22 through ducts 43.

With reference to the aforementioned apparatus, a flow of reactants is continuously fed to the reactor 1 through the opening 5.

Such a flow is fed, through a feeding duct 44, an annular distribution duct 45 and connections 46, to the inside of said heat exchangers 22, where it exchanges heat with the first reaction zone 8.

Inside said exchangers 22, as well as inside the exchangers 36, the flow of reactants has the function of operating heat exchange fluid.

At the outlet of the heat exchangers 36, the flow of reactants is collected by a toroidal collection duct 42 and is sent, through the duct 41, into the central duct 17.

The central duct 17 carries the flow of reactants up to the chamber 18 from which it flows down along the gap 20 and, passing through the wall 12 of the basket 14, spreads radially through the first reaction zone 8, where it partially reacts.

The reactant/product mixture coming out from the reaction zone 9 is collected in the gap 21 and from here passes to the collection chamber 19, from which, through the gap 48, is distributed inside the second reaction zone 26.

In the second reaction zone 26, radially crossing the catalytic bed 29, the reaction is completed.

At the outlet from the second reaction zone 26, the products flow into the collection chamber 35, from which they are conveyed to the outlet opening through a discharge duct 47.

Thanks to the configuration described above, the reactant gases are distributed along inlet walls of respective catalytic beds, shorter than the single catalytic bed of the prior art, and thus a greater crossing speed of said catalytic beds 11 and 29 is obtained by the reactant gases.

In this way is achieved an improved control of the isothermicity required for improving the reaction yields of the reactor, for avoiding damage to the catalyst, and for preventing a deterioration of the inner parts of the reactor.

According to an advantageous embodiment of the present invention, it is possible to arrange a different number of heat exchangers in each catalytic bed, according to the required amount of heat to exchange.

Figure 2:
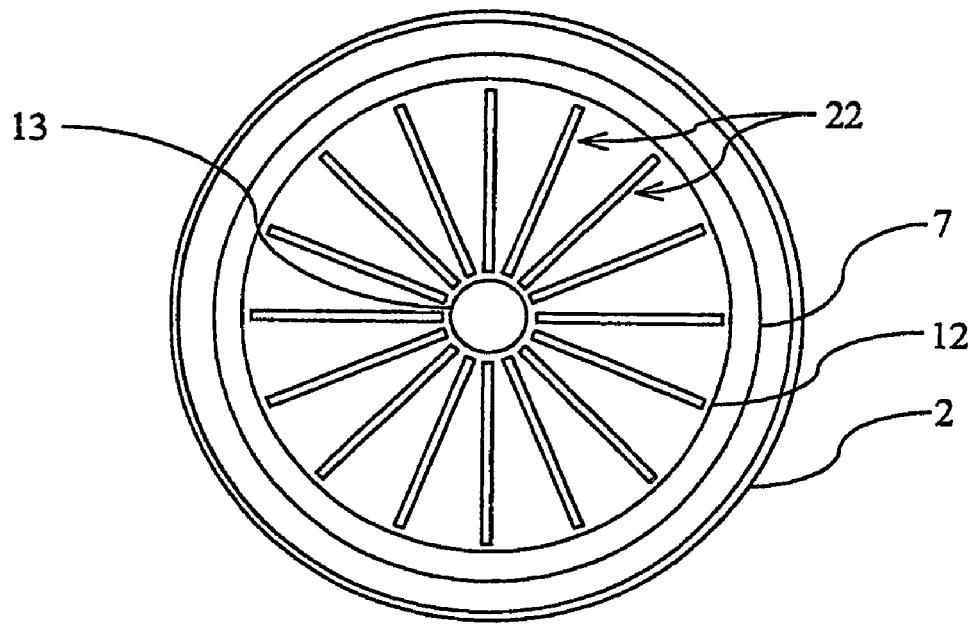
FIGS. 2 and 3 each schematically show section views of a detail of FIG. 1.
Figure 3:
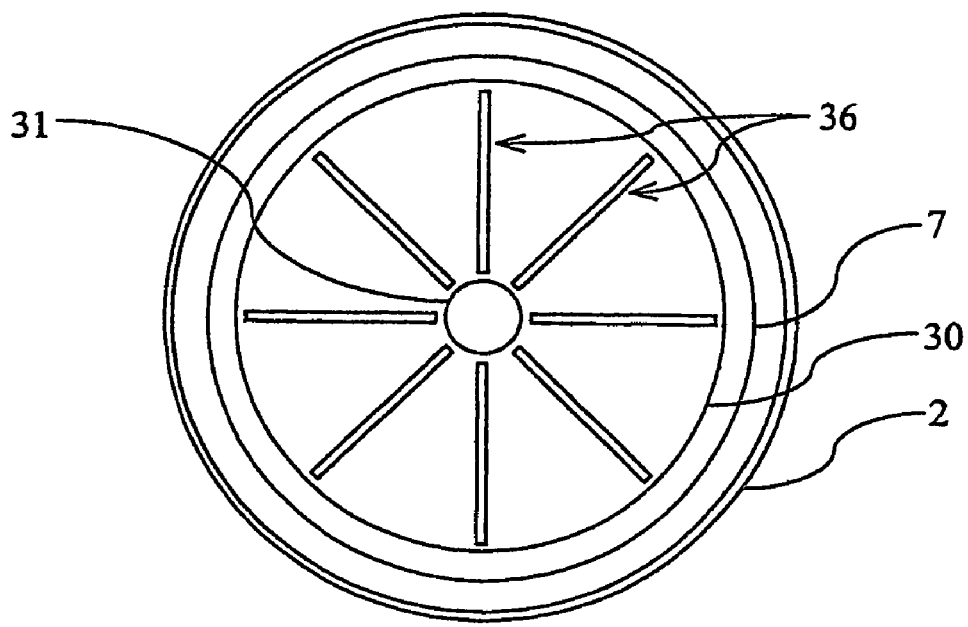

In other words, according to FIGS. 2 and 3 which represent sections of the reactor according to the planes B-B and C-C respectively, it is possible to insert a greater number of exchangers 22 inside the first catalytic bed 11, where the concentration of reactants is the greatest and the reaction takes place more quickly, with the consequent need for a greater heat exchange.

A lesser number of exchangers 36 is, on the other hand, required inside the second catalytic bed 29, where the concentration of reactants is lesser than the previous situation and the reaction proceeds more slowly, thus requiring a lesser heat exchange.

In this way, a saving is also obtained on the number of exchangers to be used, with a consequent economic return.

For the same purpose it is possible to vary the length of the catalytic beds, in order to control the crossing speed thereof by the reactant gases and thus to control the isothermicity of the reaction (see the example of FIG. 1).

Thanks to the reactor according to the present invention, it is possible to carry out a method for optimising pseudo-isothermal catalytic reactions, comprising the steps of feeding reactants to a reaction zone 8 comprising a catalytic bed 11 and a plurality of heat exchangers 22 placed in said catalytic bed 11, and the further steps of collecting reactants and products coming from the reaction zone 8, conveying said reactants and products to a second reaction zone 26 comprising a respective catalytic bed 29 and a respective plurality of heat exchangers 36 placed in said catalytic bed 29, feeding said reactants and products to said second reaction zone 26 and completing the reaction in said catalytic bed 29.

The invention thus conceived is susceptible to further variants and modifications, all covered by the scope of protection of the present invention defined by the following claims.

The invention claimed is:

1. A pseudo-isothermal radial chemical reactor for catalytic reactions, comprising:
    a substantially cylindrical shell closed at the opposite ends by respective base plates;
    a radial reaction zone comprising a respective catalytic bed and a plurality of heat exchangers placed in said respective catalytic bed; and
    at least one second further radial reaction zone comprising a respective catalytic bed and a plurality of heat exchangers placed in said respective catalytic bed of said second radial reaction zone, said first and said second radial reaction zones being in fluid communication with each other.

2. Chemical reactor according to claim 1, wherein said first and said second reaction zone are associated in series.

3. Chemical reactor according to claim 2, wherein the plurality of heat exchangers of at least one of said reaction zones is in fluid communication with the outside.

4. Chemical reactor according to claim 3, wherein the pluralities of heat exchangers of both of said reaction zones are in fluid communication with each other.

5. Chemical reactor according to claim 4, wherein at least one exchanger of said pluralities of heat exchangers is plate-shaped, rectangular and boxed.

6. Chemical reactor according to claim 5, wherein said plurality of exchangers is arranged radially, coaxially with respect to the axis of the reactor.

7. A method for optimizing pseudo-isothermal catalytic reactions, comprising the steps of:
- feeding reactants to a radial reaction zone comprising a catalytic bed and a plurality of heat exchangers placed in said catalytic bed;
- collecting reactants and products coming from the radial reaction zone;
- conveying said reactants and products to a second radial reaction zone comprising a respective catalytic bed and a respective plurality of heat exchangers placed in said catalytic bed; and
- feeding said reactants and products to said second radial reaction zone and completing the reaction in said catalytic bed.

* * * * *